M. B. PIERSON.
RESILIENT WHEEL.
APPLICATION FILED SEPT. 4, 1909.
971,557. Patented Oct. 4, 1910.
2 SHEETS—SHEET 2.
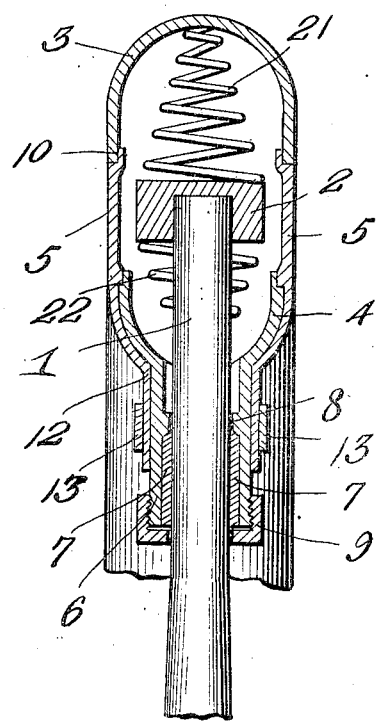
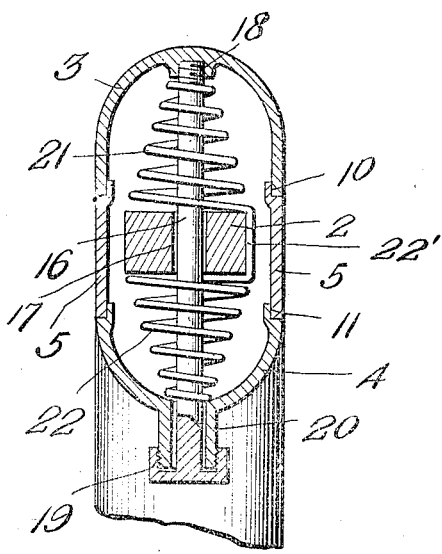
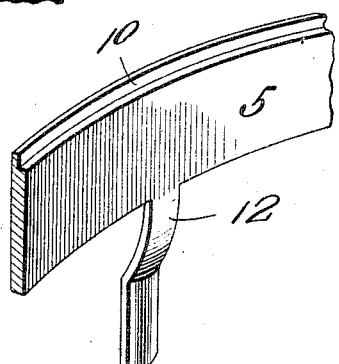
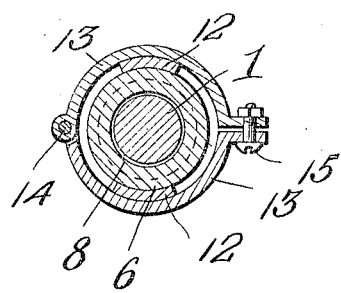
Witnesses
Chas. L. Griesbauer
E. M. Ricketts
Inventor
M. B. Pierson
By Watson E. Coleman
Attorney

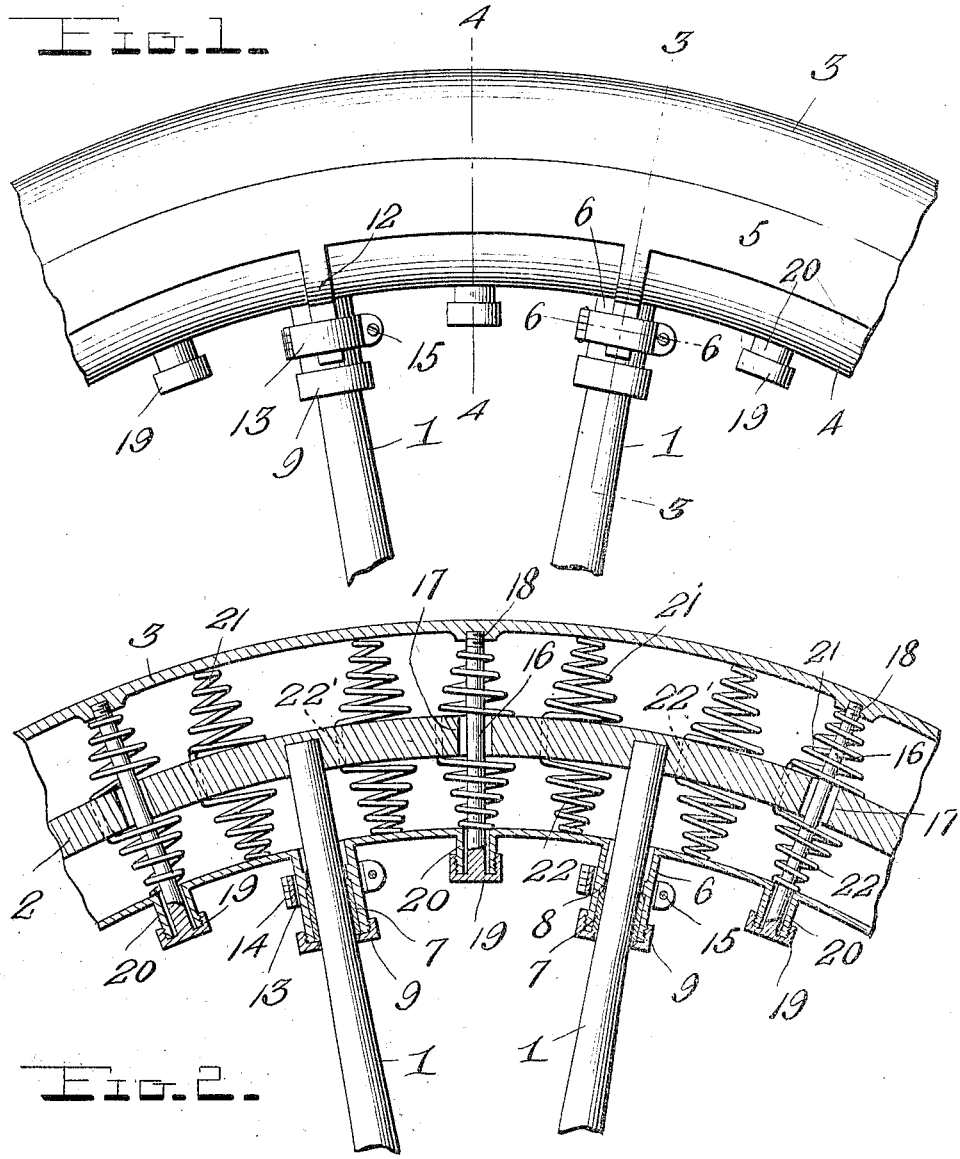

UNITED STATES PATENT OFFICE.

MARIAN BUNION PIERSON, OF CORPUS CHRISTI, TEXAS, ASSIGNOR OF ONE-HALF TO HERMAN MENLY, OF CORPUS CHRISTI, TEXAS.

RESILIENT WHEEL.

971,557.

Specification of Letters Patent. Patented Oct. 4, 1910.

Application filed September 4, 1909. Serial No. 516,173.

*To all whom it may concern:*

Be it known that I, MARIAN BUNION PIERSON, a citizen of the United States, residing at Corpus Christi, in the county of Nueces and State of Texas, have invented certain new and useful Improvements in Resilient Wheels, of which the following is a specification, reference being had to the accompanying drawings.

This invention relates to improvements in resilient wheels of that class having spring supported tires or tread members to absorb shocks and jars incident to travel over rough roads.

The object of the invention is to provide a simple and practical device of this character which will be an effective substitute for a pneumatic tire, the parts of which may be readily assembled and disconnected.

With the above and other objects in view, the invention consists of the novel construction, combination and arrangements of parts, hereinafter fully described and claimed, and illustrated in the accompanying drawings, in which—

Figure 1 is a side elevation of a portion of the improved wheel. Fig. 2 is a longitudinal section through the parts shown in Fig. 1. Figs. 3 and 4 are detail cross sectional views taken on the planes indicated by the lines 3—3 and 4—4 respectively in Fig. 1. Fig. 5 is a detail sectional perspective of one of the side plates or sections, and Fig. 6 is a detail section taken on the plane indicated by the line 6—6 in Fig. 1.

The improved wheel comprises a suitable hub from which radiate spokes 1 united at their outer ends by a continuous rigid felly 2. Surrounding the felly and the outer portions of the spokes and movable radially thereon, is a hollow spring supported tire or tread consisting of an outer or tread section 3, an inner spoke engaging section 4 and side plates or sections 5. The tread section 3 of the wheel rim or tire is of substantially semicircular shape in cross section and of greater width than the felly or inner rim 2, which latter is adapted to enter it. The inner rim section 4 is also of substantially semicircular shape in cross section but disposed with its channel or open side outwardly so as to oppose the channel portion of the outer section 3. Said inner section 4 is formed at intervals with inwardly extending tubular projections 6 adapted to receive the spokes 1 so that the latter may have sufficient movement therein to permit of the radial movement of the rim or tire with respect to the stationary central portion of the wheel. A suitable stem or oil packing 7 is arranged in each of the tubular projections 6 to prevent water, dust, etc., from entering the hollow tire or rim, such packing being retained in position between an annular inturned shoulder 8 and a screw cap 9, as clearly shown in Fig. 3 of the drawing.

Each of the side plates or sections 5 may be made from a single circular plate or from a plurality of arc-shaped sections, and they have their outer edges grooved or flanged as shown at 10 to receive the edges of the section 3. The inner edges of the sections 5 engage the grooved or shouldered outer edges 11 of the inner section 4 and said sections 5 are formed at intervals with inwardly extending tongues 12 to engage opposite points of the outer face of the section 4 and the tubular projections 6. Two part clamps 13 are arranged on the projections 6 to clamp the tongues 12 thereon, said clamps 13 each consisting of two similar half sections united at one end by a pivot 14 and having their other ends adjustably secured by a bolt or fastening 15, as clearly shown in Fig. 6.

The outer and inner sections of the tire or rim are united and the latter is guided in its radial movement by means of false spokes or connecting and guiding rods 16. The latter are radially disposed at intervals around the wheel, one being preferably arranged between each pair of spokes, and they are disposed in longitudinally extending slots 17 formed in the felly 2. The outer ends of the rods 16 are screwed into sockets 18 formed in bosses on the inner face of the section 3, and the inner ends of said rods 16 are integral with flanged heads 19 internally screw threaded to engage tubular projections 20 formed at intervals on the inner section 4. The screw threads on the parts 18 and 19 have the same pitch so that when the outer end of the rod 16 enters its screw threaded socket the flanged head or cap on the inner end of said rod will engage the projection or extension 20.

The hollow tire or rim is resiliently supported on the felly 2 by outer and inner rows of coil springs 21, 22. These springs are preferably of conical form with their large ends engaged with the outer and inner faces of the felly 2, and they are preferably but not necessarily made integral with each other. When made integral the springs have their large ends united by a part 22', as shown in Fig. 4. Said springs are also arranged in pairs, one pair being on each of the connecting and guiding rods 16, and two pairs being arranged between adjacent rods as clearly shown in Fig. 2. While this is the preferred arrangement of the springs it will be understood that they may be otherwise arranged and a greater or less number of them may be employed.

The improved wheel may be made of wood, metal or any suitable material.

In assembling the several parts of the invention the inner tire section 4 is placed on the spokes 1 before the rim 2 is placed in position. The springs are then applied to the rim or felly 2 and the outer tire section 3 is then applied to the outer row of springs 21 and secured in position by inserting the rods 16 in position, as shown in Fig. 2. The side sections or plates 5 of the tire casing may then be applied to the inner and outer sections and secured as shown in Fig. 5.

From the foregoing it will be seen that the invention provides a simple, strong and durable resilient wheel which will be an effective substitute for a pneumatic tire wheel and the parts of which may be quickly and easily assembled for use and as readily disconnected for cleaning and repairing purposes. The peculiar construction of the hollow tire or rim renders it strong and durable when its parts are assembled and also moisture and dirt proof so that the inclosed springs will be well protected.

Having thus described the invention what is claimed is:

1. A resilient wheel comprising radial spokes, a rigid felly uniting the same and formed with radial slots, an outer tire section, an inner tire section having tubular spoke-receiving projections, intermediate tubular projections on said inner tire section, and connecting and guiding rods passing through said intermediate tubular projections and loosely through the slots in said felly, the outer ends of said rods being screwed into the outer section, and the inner ends of said rods having flanged heads screwed on to said intermediate projections, a packing in each of said spoke-receiving projections, an outer row of springs between the felly and the outer tire section, and an inner row of springs between the felly and the inner tire section.

2. A resilient wheel comprising radial spokes, a rigid felly uniting the same, a hollow sectional tire surrounding the felly and movable radially relatively thereto, said tire being provided with inwardly extending tubular projections to receive the spokes; a packing in each of said projections, an inner row of springs between the felly and the inner section of the tire, and an outer row of springs between the felly and the outer section of the tire, said rows of springs resiliently supporting the tire from the felly.

3. A resilient wheel comprising radial spokes, a rigid felly uniting the same and formed with radial slots, an outer tire section, an inner tire section having intermediate tubular projections, connecting and guiding rods passed through said intermediate tubular projections and loosely through the slots in said felly, the outer ends of said rods being screwed into the outer section and the inner ends of said rods having flanged heads screwed on to said intermediate projections, and inner and outer rows of springs, the inner row of springs being interposed between the felly and the inner tire section, and the outer row of springs being interposed between the felly and the outer tire section.

4. A resilient wheel comprising radial spokes, a rigid felly uniting the same and formed with radial slots, an outer tire section, an inner tire section having tubular spoke-receiving projections, and intermediate tubular projections, connecting and guiding rods passed through said intermediate tubular projections and loosely through the slots in said felly, the outer ends of said rods being screwed into the outer section and the inner ends of said rods having flanged heads screwed on to said intermediate projections, side sections engaged with the opposing edges of the inner and outer sections and provided with inwardly extending tongues to engage the spoke-receiving projections, clamps for securing said tongues to said spoke-receiving projections and inner and outer rows of springs, the inner row of springs being interposed between the felly and the inner tire section, and the outer row of springs being interposed between the felly and the outer tire section.

5. A resilient wheel comprising radial spokes, a rigid felly uniting the same, a tire casing having inner and outer sections and side plates, the latter having inwardly projecting arms, and the inner tire section having tubular spoke-receiving projections, means uniting the inner and outer tire sections, springs for cushioning the tire casing on the felly, and clamping devices uniting the arms of the side plates of the tire casing to said spoke-receiving projections.

In testimony whereof I hereunto affix my signature in the presence of two witnesses.

MARIAN BUNION PIERSON.

Witnesses:
N. W. ELMORE,
J. F. DUNN.

It is hereby certified that in Letters Patent No. 971,557, granted October 4, 1910, upon the application of Marian Bunion Pierson, of Corpus Christi, Texas, for an improvement in "Resilient Wheels," the name of the assignee was erroneously written and printed "Herman Menly" whereas said name should have been written and printed *Herman Menly;* and that the said Letters Patent should be read with this correction therein that the same may conform to the record of the case in the Patent Office.

Signed and sealed this 10th day of January, A. D., 1911.

[SEAL.]

C. C. BILLINGS,

*Acting Commissioner of Patents.*